(12) United States Patent
Yao et al.

(10) Patent No.: US 11,190,423 B2
(45) Date of Patent: Nov. 30, 2021

(54) CONNECTION POINT RELATED PERFORMANCE MEASUREMENTS IN A NETWORK FUNCTION VIRTUALIZATION ENVIRONMENT

(71) Applicant: APPLE INC., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 16/126,162

(22) Filed: Sep. 10, 2018

(65) Prior Publication Data

US 2019/0044838 A1    Feb. 7, 2019

Related U.S. Application Data

(60) Provisional application No. 62/562,021, filed on Sep. 22, 2017.

(51) Int. Cl.
*H04L 12/26* (2006.01)
*G06F 9/455* (2018.01)

(52) U.S. Cl.
CPC ...... *H04L 43/0811* (2013.01); *G06F 9/45558* (2013.01); *H04L 43/062* (2013.01); *H04L 43/0876* (2013.01); *H04L 43/0894* (2013.01); *G06F 2009/45583* (2013.01); *G06F 2009/45595* (2013.01)

(58) Field of Classification Search
CPC ...... H04L 43/06–43/50; G06F 9/45558; G06F 2009/45562–2009/45595
See application file for complete search history.

(56) References Cited

U.S. PATENT DOCUMENTS

| | | | |
|---|---|---|---|
| 2017/0150399 A1* | 5/2017 | Kedalagudde | H04L 43/16 |
| 2018/0013656 A1* | 1/2018 | Chen | H04W 24/04 |
| 2019/0028350 A1* | 1/2019 | Yeung | H04L 41/0893 |
| 2019/0036869 A1* | 1/2019 | Jana | H04L 41/5025 |
| 2019/0052528 A1* | 2/2019 | Yoshimura | H04L 41/0896 |
| 2019/0073269 A1* | 3/2019 | Chou | H04L 43/00 |
| 2019/0129742 A1* | 5/2019 | Hasegawa | H04L 41/22 |
| 2019/0166017 A1* | 5/2019 | Chou | H04L 41/044 |
| 2019/0173622 A1* | 6/2019 | Xiong | H04W 76/27 |

* cited by examiner

*Primary Examiner* — Clayton R Williams
(74) *Attorney, Agent, or Firm* — Fay Kaplun & Marcin, LLP

(57) ABSTRACT

An apparatus of a Virtualized Network Function Manager (VNFM) comprises one or more processors to receive one or more performance measurements related to a virtual network interface that are collected for a virtual compute instance from a Virtualized Infrastructure Manager (VIM) in a collection interval, to map a measured object of the one or more performance measurements from the virtual compute instance to a Virtual Network Function (VNF) and/or VNF component (VNFC) instance, and to map the virtual network interface to a connection point (CP) associated with the VNF or VNFC instance, to generate one or more performance measurements related the CP for the VNF or VNFC instance. The one or more performance measurements related the CP for the VNF or VNFC instance are to be reported to an Element Manager (EM) or to a Network Function Virtualization Orchestrator (NFVO), or a combination thereof.

20 Claims, 6 Drawing Sheets

CONNECTION POINT RELATED PERFORMANCE MEASUREMENTS IN A NETWORK FUNCTION VIRTUALIZATION ENVIRONMENT

CROSS-REFERENCE TO RELATED APPLICATIONS

The present application claims the benefit of U.S. Provisional Application No. 62/562,021 filed Sep. 22, 2017. Said Application No. 62/562,021 is hereby incorporated herein by reference in its entirety.

BACKGROUND

In a Network functions virtualization environment, the Operations Support System (OSS) and/or Network Manager (NM), Element Manager (EM) and Network Function Virtualization Orchestrator (NFVO) should monitor the performance of connection point (CP) or virtual link(VL) of a Virtual Network Function (VNF) and/or VNF component (VNFC) instance or network service (NS) instance, as the performance of CP/VL may be impacted by the virtual network interface of the virtualized compute resource. The Virtualized Infrastructure Manager (VIM) collects the performance measurements related to virtual network interface of the virtualized compute resource from the NFV Infrastructure (NFVI) and reports the measurements to the VNF Manager (VNFM). Currently, no solution exists for the VNFM to generate the CP related performance measurements based on the virtual network interface related measurements received from the VIM.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
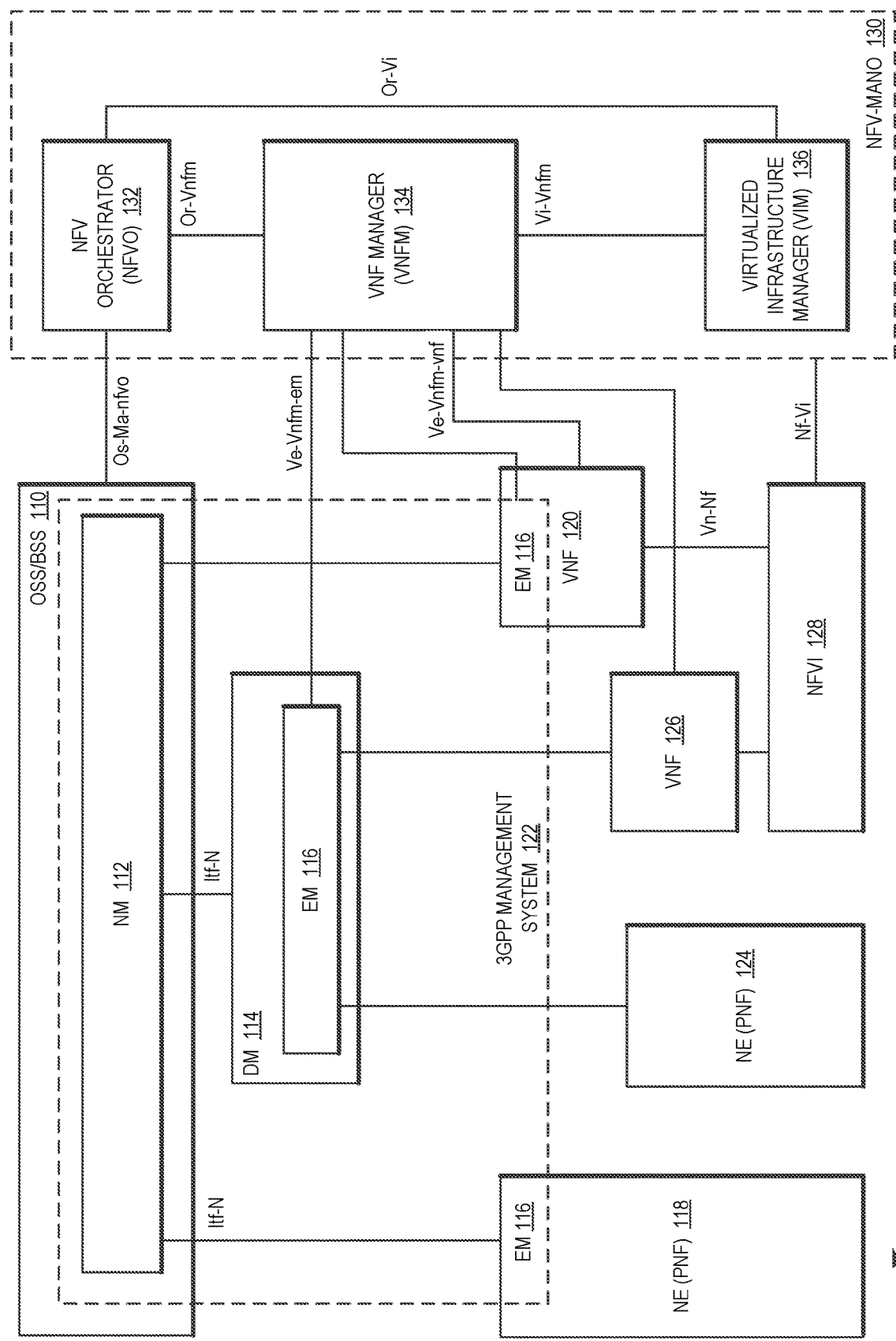
FIG. 1 is a block diagram of management architecture that includes once or more virtual network functions (VNFs) in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

Referring now to FIG. 1, a block diagram of management architecture that includes once or more virtual network functions (VNFs) in accordance with one or more embodiments will be discussed.

FIG. 1 shows a management architecture 100 of a network function virtualization (NFV) environment to support connection point (CP) related performance measurements collection and reporting. A flow diagram illustrating such measurement collection and reporting is shown and described with respect to FIG. 2, below. As shown in FIG. 1, management architecture 100 may include an Operations Support System and/or Business Support System (OSS/BSS) 110, Network Manager (NM) 112, Domain Manager (DM) 114, and Element Manager (EM) 116. Where the NFV environment comprises a Third Generation Partnership Project (3GPP) network, the NM 112, DM 114, and EM 116 may comprise a 3GPP Management System 122. Such a 3GPP Management System may control one or more network elements (NE) that operate as a Physical Network Function (PNF), for example NE (PNF) 118 and/or NE (PNF) 124, and further may control one or more Virtual Network Functions (VNF), for example VNF 120 and/or VNF 126. In some embodiments, at least a portion of EM 116 may be implemented in one or more NE (PNF) blocks such as NE (PNF) 118 and/or one or more VNF blocks such as VNF 120. An NFV Infrastructure (NFVI) 128 comprises hardware and/or software to realize the VNF blocks. In accordance with one or more embodiments, network architecture 100 may be operating in compliance with a 3GPP standard, for example 3GPP Technical Standard 28.500 V14.1.0 (2017-03) or in compliance with European Telecommunications Standards Institute (ETSI) Group Specification (GS) NFV-IFA 027 V2.4.1 (2018-05), although the scope of the claimed subject matter is not limited in these respects.

In one or more embodiments, NFV Management and Orchestration (NFV-MANO) 130 comprises and architectural framework to manage and orchestrate the VNF blocks of NFV management architecture 100, for example to implement one of more VNF blocks as one or more virtual machines running on NFVI 128. The NFV-MANO 130 may include NFV Orchestrator (NFVO) 132, VNF Manager (VNFM) 134, and/or Virtualized Infrastructure Manager (VIM) 136. Furthermore, NVF-MANO 130 may include one or more interfaces to couple with OSS/BSS 110, EM 116, one or more VNF blocks, and NFVI 128.

As described herein, OSS/BSS 110 and NM 112, EM 116, and/or NFVO 132 monitor the performance of a connection point (CP) and/or virtual link (VL) of a Virtual Network Function (VNF) and/or VNF component (VNFC) instance, or a network service (NS) instance, as the performance of a CP/VL may be impacted by the virtual network interface of the virtualized compute resource. The VIM collects the performance measurements related to a virtual network interface of the virtualized compute resource from NFVI 128 and reports the measurements to VNFM 134. As shown in and described with respect to FIG. 2, below, VNFM 134 may generate the CP related performance measurements based on the virtual network interface related measurements received from VIM 136.

Figure 2:
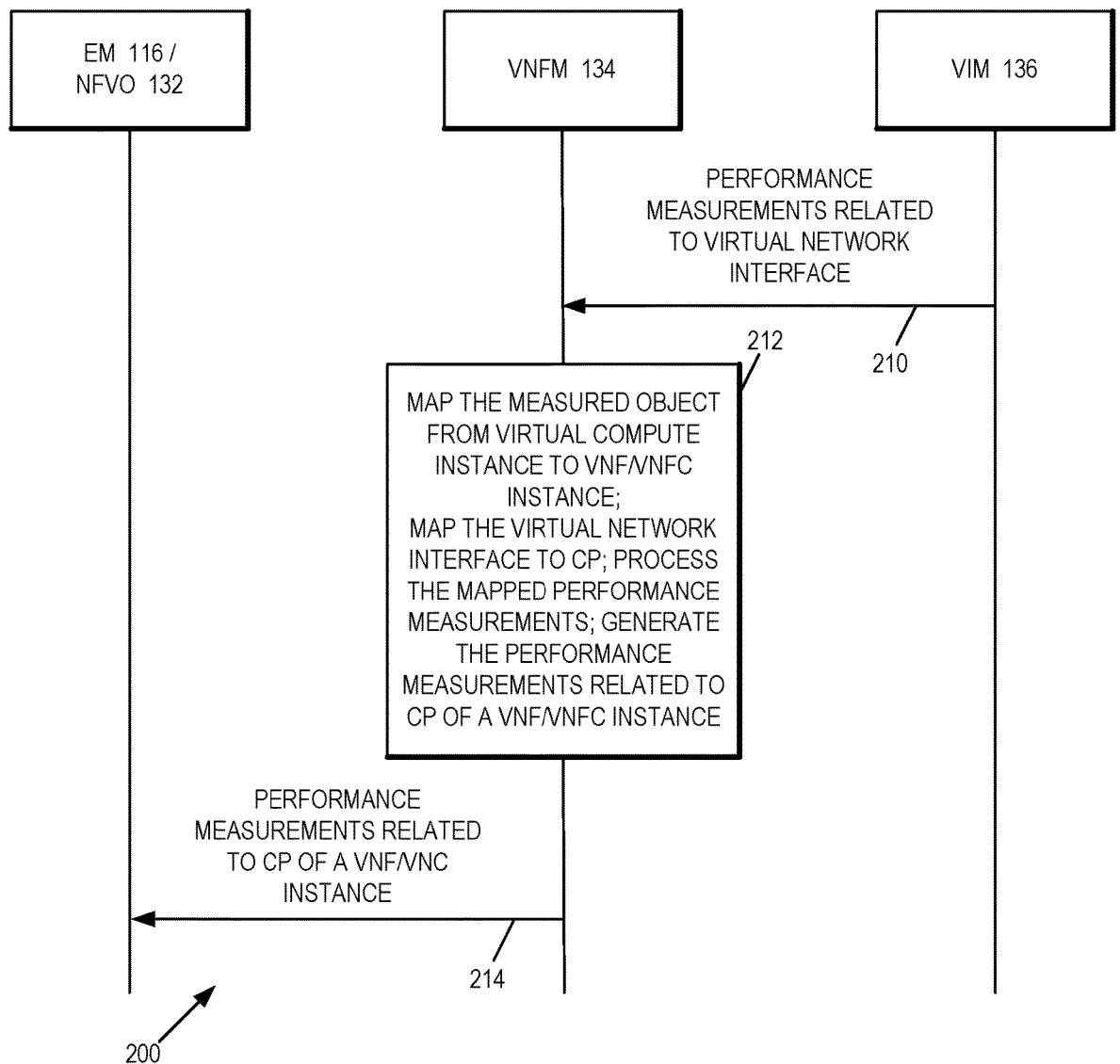
FIG. 2 is a flow diagram illustrating the collection of performance measurements related to one or more connection points (CPs) in accordance with one or more embodiments.

Referring now to FIG. 2. a flow diagram illustrating the collection of performance measurements related to one or more connection points (CPs) in accordance with one or more embodiments will be discussed. As shown in FIG. 2, the flow diagram illustrates a method 200 to collect CP related measurements by Network Function Virtualization Management and Orchestration (NFV-MANO) 130. Method 200 may include more or fewer operations in various other orders than shown in FIG. 2, and the scope of the claimed subject matter is not limited in these respects. The collected CP related measurements are indicators for monitoring the performance of the virtual link and are useful for network service descriptor (NSD) design and updating. The performance measurements related to CP are produced by Virtual Network Function Manager (VNFM) 134 based on the performance measurements related to the virtual network interface received from Virtualized Infrastructure Manager (VIM) 136.

In one or more embodiments, method 200 may include the following operations. VNFM 134 receives one or more performance measurements related to a virtual network interface of the virtual compute instances from VIM 136 at operation 210. At operation 212, VNFM 134 maps the measured object of the received performance measurements from virtual compute instance to a virtual network function (VNF)/virtual network work function component (VNFC) instance and maps each virtual network interface associated with the virtual compute instance to a CP of the VNFC instance. For example, the mapping between CP and a virtual network interface is shown in and described with respect to FIG. 3, below. At operation 212, VNFM 134 generates performance measurements related to CP for a VNF/VNFC instance by one of the following two ways. In a first way, if only a measurement is received for one virtual network interface in the collection period, the VNFM 134 assigns the value of the received performance measurement to a counter per CP of the VNFC instance. In a second way, if multiple measurements are received for one virtual network interface in the collection period, the VNFM 134 aggregates the values of the received performance measurements to a counter per CP of the VNFC instance. At operation 214, the VNFM 134 then reports to the Element Manager (EM) 116 or to the Network Function Virtualization Orchestrator 132 the performance measurements related to CP of the VNF/VNFC instance. It should be noted that EM 116 and NFVO are two different entities and this in a first embodiment the performance measurements are reported to EM 116 and in a second embodiment the performance measurements are reported to NFVO 132, and the scope of the claimed subject matter is not limited in this respect. By measuring the performance of connection points (CPs), an indication of how the network is performing may be determined. This information may be used to ensure that the components of the network are operating according to requirements, and if necessary additional resources may be allocated to one or more of the elements of the network to meet the operating requirements, for example by adding one or more additional VNF instances, although the scope of the claimed subject matter is not limited in this respect. Mapping between the connection points and the virtual network interface are shown in and described with respect to FIG. 3, below.

Figure 3:
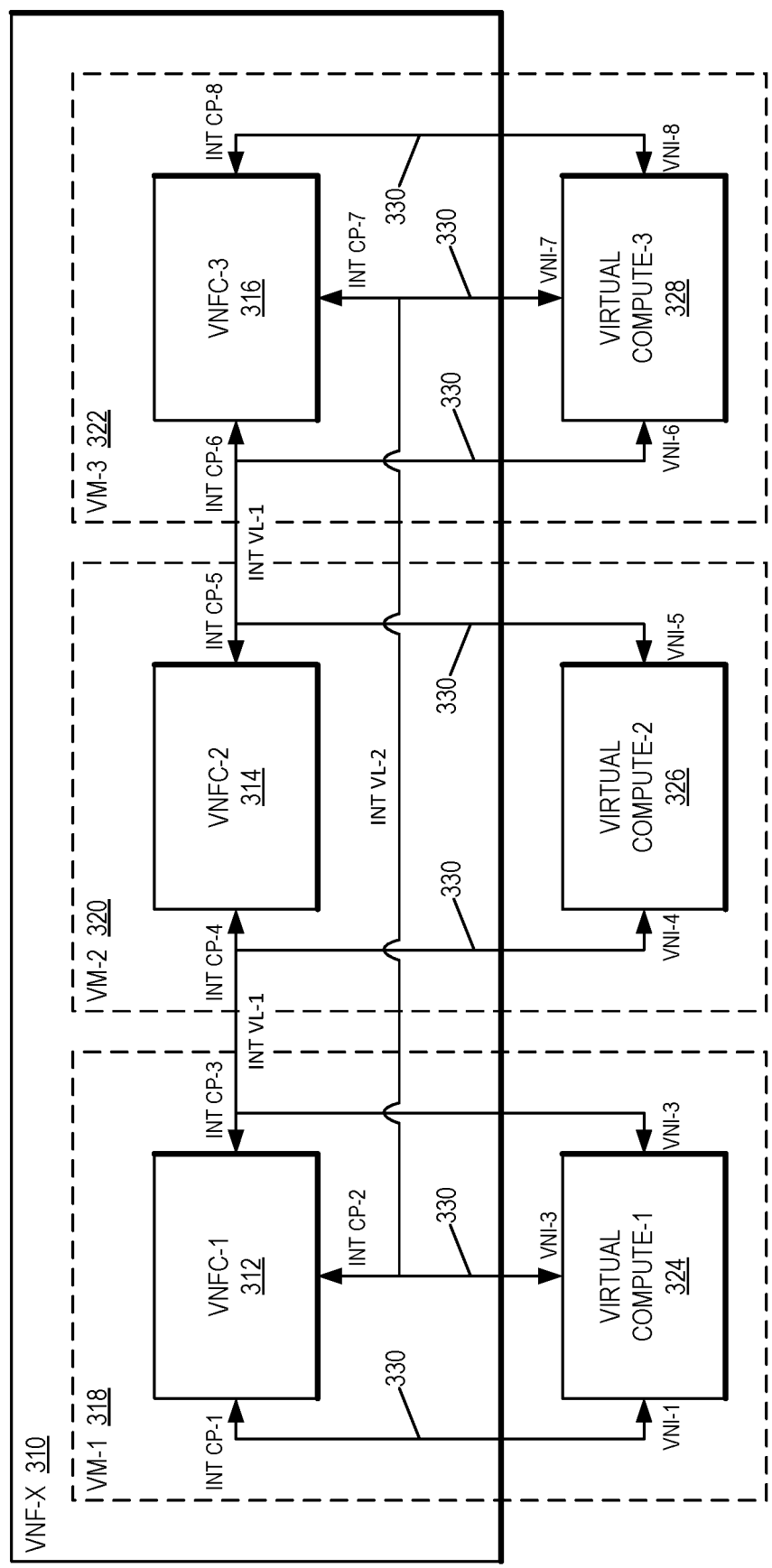
FIG. 3 is a block diagram illustrating mapping between one or more connection points (CPs) and one or more virtual network interfaces in accordance with one or more embodiments.

Referring now to FIG. 3, a block diagram illustrating mapping between one or more connection points (CPs) and one or more virtual network interfaces in accordance with one or more embodiments will be discussed. FIG. 3 shows an example of a virtual network function, VNF-X 310, that contains three VNF components, a first component (VNFC-1) 312, a second component (VNFC-2) 314, and a third component (VNFC-3) 316. In the embodiment shown, the first component (VNFC-1) 312 contains a first connection point (CP-1), a second connection point (CP-2), and a third connection point (CP-3). The second component (VNFC-2) 314 contains a fourth connection point (CP-4) and a fifth connection point (CP-5). The third component (VNFC-3) 316 contains a sixth connection point (CP-6), a seventh connection point (CP-7), and an eighth connection point (CP-8). The first component 312 is realized by a first virtual machine (VM-1) 318, the second component 314 is realized by a second virtual machine (VM-2) 320, and the third component 316 is realized by a third virtual machine (MV-3) 322.

Similarly, the first virtual machine (VM-1) 318 includes a first virtual compute engine (VIRTUAL COMPUTE-1) 324, the second virtual machine (VM-2) 320 includes a second virtual compute engine (VIRTUAL COMPUTE-2) 326, and the third virtual machine (VM-3) 322 includes a third virtual compute engine (VIRTUAL COMPUTE-3) 328. The first virtual compute engine (VIRTUAL COMPUTE-1) 324 includes a first virtual network interface (VNI-1), a second virtual network interface (VNI-2), and a third virtual network interface (VNI-3). The second virtual compute engine (VIRTUAL COMPUTE-2) 326 includes a fourth virtual network interface (VIN-4) and a fifth virtual network interface (VNI-5). The third virtual compute engine (VIRTUAL COMPUTE-3) 328 includes a sixth virtual network interface (VNI-6), a seventh virtual network interface (VNI-7), and an eight virtual network interface (VNI-8). A first virtual layer interface (INT VL-1) is disposed between VNFC-1 and VNFC-2 and between VNFC-2 and VNFC-3. A second virtual layer interface (INTL VL-2 is disposed between VNFC-1 and VNFC-3. Mapping between the internal connection points (CPs) of VNF-X 310 and the virtual network interfaces of the virtual compute engines is shown by mapping lines 330.

In one or more embodiments, one or more performance measurements may be defined in the following sections of European Telecommunications Standards Institute (ETSI) Group Specification (GS) NFV-IFA 027 V2.4.1 (2018-05). The ETSI GS NFV-IFA 027 V2.4.1 (2018-05) is hereby incorporated herein in its entirety.

7.2.7 Peak disk usage of VNF/VNFC instance a) Description: This measurement provides the peak disk usage of the underlying Virtual Compute instances related to a VNF instance or to a VNFC instance in a VNF instance. This measurement is split into sub-counters per Virtual Compute instance.

b) Collection Method: OM.

c) Trigger: VNFM receives one or more VdiskUsagePeak measurement(s) (see clause 7.1.7) for the VirtualCompute instance(s) from the VIM in the collection period, and maps the received VdiskUsagePeak measurement(s) from the VirtualCompute instance to the VNF instance, or the combination of VNF instance and VNFC instance. The VNFM generates the measurement for the subject VNF/VNFC instance by assigning the value or taking the maximum of multiple values of the received VdiskUsagePeak measurement(s) to the sub-counter(s) per VirtualCompute instance.

d) Measurement Unit: Each measurement is a real value (Unit: %).

e) Measurement Group: VirtualisedComputeResource.

f) Measured Object Type: VNF, VNFC.

g) Measurement Name: VdiskUsagePeakVnf.vComputeId, where vComputeId is equal to the objectInstanceId of the measured object of the mapped measurement.

h) Measurement Context:

MeasurementEndTime: Indicates the end time (see ETSI GS NFV-TST 008 [10]) of the VdiskUsageMean measurement with peak value received from NFVI for the measured Virtualised compute resource in the collection period;

MeasurementInterval: Equals the "number of VdiskUsageMean measurements"*"measurement interval (see ETSI GS NFV-TST 008 [10]) of the VdiskUsageMean measurements" received from NFVI for the measured Virtualised compute resource in the collection period.

7.2.8 Number of incoming bytes of VNF internal CP
a) Description: This measurement provides the number of bytes received by a VNF internal Connection Point (CP).
b) Collection Method: OM.
c) Trigger: VNFM receives one or more VnetByteIncoming.vNetItfId measurement(s) (see clause 7.1.8) for the Virtual Compute instance(s) from the VIM in the collection period, and maps the received VnetByteIncoming.vNetItfId measurement(s) from the Virtual Compute instance to the VNF internal CP instance. The VNFM generates the measurement for the subject VNF internal CP instance by assigning the value, or summing up multiple values, of the mapped VnetByteIncoming.vNetItfId subcounter(s).
d) Measurement Unit: Each measurement is an integer value.
e) Measurement Group: VnfInternalCP.
f) Measured Object Type: VnfIntCP.
g) Measurement Name: ByteIncomingVnfIntCP.
VnetByteIncoming.vNetItfId measurement received from NFVI for the measured CP in the collection period;
MeasurementInterval: Equals the "number of VnetByteIncoming.vNetItfId measurements"*"measurement interval (see ETSI GS NFV-TST 008 [10]) of the VnetByteIncoming.vNetItfId measurements" received from NFVI for the measured CP in the collection period;
MeasurementInterfaceStatus: Indicates the interface status (see ETSI GS NFV-TST 008 [10]) when the last VnetByteIncoming.vNetItfId measurement received from NFVI for the measured CP in the collection period is generated.

7.2.9 Number of outgoing bytes of VNF internal CP
a) Description: This measurement provides the number of bytes transmitted by a VNF internal CP.
b) Collection Method: OM.
c) Trigger: VNFM receives one or more VnetByteOutgoing.vNetItfId measurement(s) (see clause 7.1.9) for the Virtual Compute instances from the VIM in the collection period, and maps the received VnetByteOutgoing.vNetItfId measurement(s) from the Virtual Compute instance to the VNF internal CP instance. The VNFM generates the measurement for the subject VNF internal CP instance by mapping the value of vNetItfId to the CP of the VNFC instance, and assigning the value, or summing up multiple values, of the mapped VnetByteOutgoing.vNetItfId subcounter(s).
d) Measurement Unit: Each measurement is an integer value.
e) Measurement Group: VnfInternalCP.
Measured Object Type: VnfIntCP.
g) Measurement Name: ByteOutgoingVnfIntCP.
h) Measurement Context:
MeasurementEndTime: Indicates the end time (see ETSI GS NFV-TST 008 [10]) of the last VnetByteOutgoing.vNetItfId measurement received from NFVI for the measured CP in the collection period;
MeasurementInterval: Equals the "number of VnetByteOutgoing.vNetItfId measurements"*"measurement interval (see ETSI GS NFV-TST 008 [10]) of the VnetByteOutgoing.vNetItfId measurements" received from NFVI for the measured CP in the collection period;
MeasurementInterfaceStatus: Indicates the interface status (see ETSI GS NFV-TST 008 [10]) when the last VnetByteOutgoing.vNetItfId measurement received from NFVI for the measured CP in the collection period is generated.

7.2.10 Number of incoming packets of VNF internal CP
a) Description: This measurement provides the number of packets received by a VNF internal CP.
b) Collection Method: OM.
c) Trigger: VNFM receives one or more VnetPacketIncoming.vNetItfId measurement(s) (see clause 7.1.10) for the Virtual Compute instances from the VIM in the collection period, and maps the received VnetPacketIncoming.vNetItfId measurement(s) from the Virtual Compute instance to the VNF internal CP instance. The VNFM generates the measurement for the subject VNF internal CP instance by mapping the value of vNetItfId to the CP of the VNFC instance, and assigning the value, or summing up multiple values, of the mapped VnetPacketIncoming.vNetItfId subcounter(s).
d) Measurement Unit: Each measurement is an integer value.
e) Measurement Group: VnfInternalCP.
Measured Object Type: VnfIntCP.
g) Measurement Name: PacketIncomingVnfIntCP.
h) Measurement Context:
MeasurementEndTime: Indicates the end time (see ETSI GS NFV-TST 008 [10]) of the last VnetPacketIncoming.vNetItfId measurement received from NFVI for the measured CP in the collection period;
MeasurementInterval: Equals the "number of VnetPacketIncoming.vNetItfId measurements"*"measurement interval (see ETSI GS NFV-TST 008 [10]) of the VnetPacketIncoming.vNetItfId measurements" received from NFVI for the measured CP in the collection period;
MeasurementInterfaceStatus: Indicates the interface status (see ETSI GS NFV-TST 008 [10]) when the last VnetPacketIncoming.vNetItfId measurement received from NFVI for the measured CP in the collection period is generated.

7.2.11 Number of outgoing packets of VNF internal CP
a) Description: This measurement provides the number of packets transmitted by a VNF internal CP.
b) Collection Method: OM.
c) Trigger: VNFM receives one or more VnetPacketOutgoing.vNetItfId measurement(s) (see clause 7.1.11) for the Virtual Compute instances from the VIM in the collection period, and maps the received VnetPacketOutgoing.vNetItfId measurement(s) from the Virtual Compute instance to the VNF internal CP instance. The VNFM generates the measurement for the subject VNF internal CP instance by mapping the value of vNetItfId to the CP of the VNFC instance, and assigning the value, or summing up multiple values, of the mapped VnetPacketOutgoing.vNetItfId subcounter(s).
d) Measurement Unit: Each measurement is an integer value.
e) Measurement Group: VnfInternalCP.
f) Measured Object Type: VnfIntCP.
g) Measurement Name: PacketOutgoingVnfIntCP.

h) Measurement Context:
   MeasurementEndTime: Indicates the end time (see ETSI GS NFV-TST 008 [10]) of the last VnetPacketOutgoing.vNetItfId measurement received from NFVI for the measured CP in the collection period;
   MeasurementInterval: Equals the "number of VnetPacketOutgoing.vNetItfId measurements"*"measurement interval (see ETSI GS NFV-TST 008 [10]) of the VnetPacketOutgoing.vNetItfId measurements" received from NFVI for the measured CP in the collection period;
   MeasurementInterfaceStatus: Indicates the interface status (see ETSI GS NFV-TST 008 [10]) when the last VnetPacketOutgoing.vNetItfId measurement received from NFVI for the measured CP in the collection period is generated.

Figure 4:
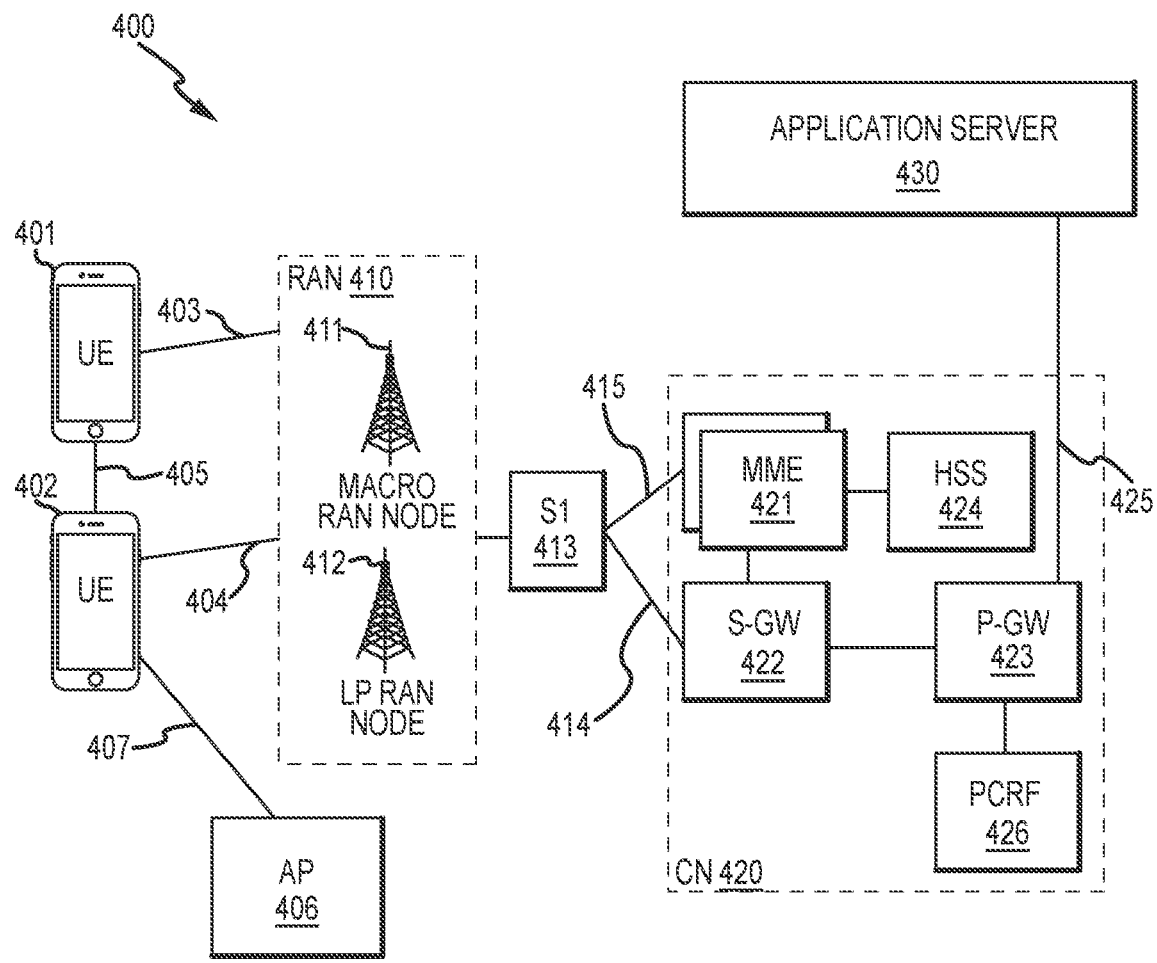
FIG. 4 illustrates an architecture of a system 400 of a network in accordance with some embodiments.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410—the RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMEs 421, the S-GW 422, the Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network 423 and external networks such as a network including the application server 430 (alternatively referred to as application function (AF)) via an Internet Protocol (IP) interface 425. Generally, the application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
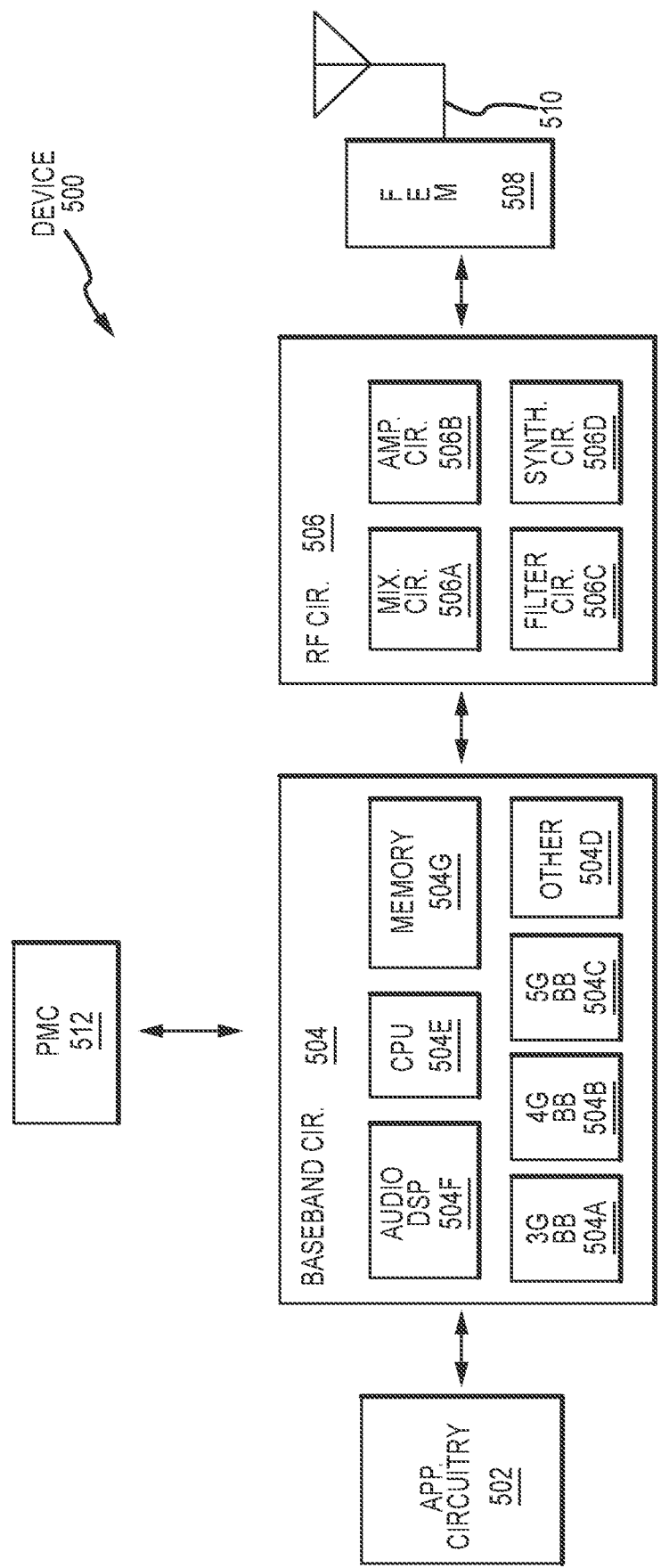
FIG. 5 illustrates example components of a device in accordance with some embodiments.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include less elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuity 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage-controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

While FIG. 5 shows the PMC 512 coupled only with the baseband circuitry 504. However, in other embodiments, the PMC 5 12 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used execute Layer 3, Layer 2, or Layer 1 functionality, while processors of the application circuitry 504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
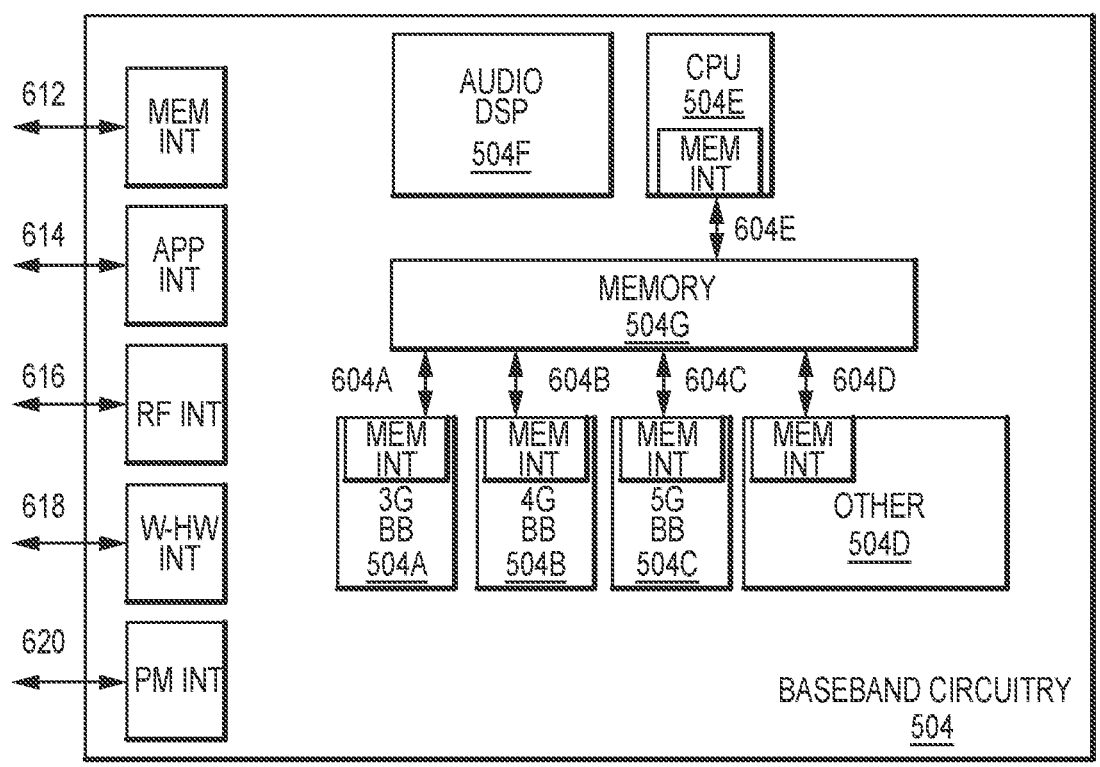
FIG. 6 illustrates example interfaces of baseband circuitry in accordance with some embodiments.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512.

The following are example implementations of the subject matter described herein. It should be noted that any of the examples and the variations thereof described herein may be used in any permutation or combination of any other one or more examples or variations, although the scope of the claimed subject matter is not limited in these respects.

In example one, an apparatus of a Virtualized Network Function Manager (VNFM) comprises one or more processors to receive one or more performance measurements related to a virtual network interface that are collected for a virtual compute instance from a Virtualized Infrastructure Manager (VIM) in a collection interval, to map a measured object of the one or more performance measurements from the virtual compute instance to a Virtual Network Function (VNF) or a VNF component (VNFC) instance, and to map the virtual network interface to a connection point (CP) associated with the VNF or VNFC instance, to generate one or more performance measurements related the CP for the VNF or VNFC instance, wherein the one or more performance measurements related the CP for the VNF or VNFC instance are to be reported to an Element Manager (EM) or to a Network Function Virtualization Orchestrator (NFVO), or a combination thereof, and a memory to store the one or more performance measurements related to the CP for the VNF or the VNFC instance. Example two may include the subject matter of example one or any of the examples described herein, wherein the one or more performance measurements related the CP for the VNF or VNFC instance are split to sub-counter per CP of the VNFC instance contained by the VNF instance. Example three may include the subject matter of example one or any of the examples described herein, wherein the virtualized network interface has one to one mapping to the CP. Example four may include the subject matter of example one or any of the examples described herein, wherein the one or more performance measurements related the CP for the VNF or VNFC instance are generated by assigning a value of the received performance measurement related to a virtual network interface to counter per CP of a VNFC instance contained by a VNF instance if a measurement is received in a collection period. Example five may include the subject matter of example one or any of the examples described herein, wherein the one or more performance measurements related the CP for the VNF or VNFC instance are generated by aggregating the values of the one or more received performance measurements related to the virtual network interface to the counter per CP of a VNFC instance contained by a VNF instance if multiple measurements are received in a collection period. Example six may include the subject matter of example one or any of the examples described herein, wherein the VNF instance related to the one or more generated measurements may contain one or more VNFC instances, wherein each VNFC instance contains one or more CPs. Example seven may include the subject matter of example one or any of the examples described herein, wherein an identifier vnfcInstanceIdCPId is used to identify a sub-counter, wherein vnfcInstanceId identifies the VNFC instance and CPId identifies the CP.

In example eight, an apparatus of a Network Function Virtualization Orchestrator (NFVO) comprises one or more processors to receive one or more performance measurements related to a connection point (CP) with VNF or a VNFC instance as a measured object from a Virtualized Network Function Manager (VNFM), wherein the one or more received performance measurements comprise a mapping of the measured object to the VNF or VNFC instance and a mapping of a virtual network interface to the connection point, and a memory to store the one or more received performance measurements. Example nine may include the subject matter of example eight or any of the examples described herein, wherein the one or more performance measurements include a number of incoming bytes received in the virtual network interface or a number of outgoing bytes transmitted in the virtual network interface. Example eight may include the subject matter of example ten or any of the examples described herein, wherein the one or more performance measurements include a number of incoming packets received in the virtual network interface or a number of outgoing packets transmitted in the virtual network interface.

In example eleven, an apparatus of an Element Manager (EM) comprises one or more processors to receive one or more performance measurements related to a connection point (CP) with VNF or a VNFC instance as a measured object from a Virtualized Network Function Manager (VNFM), wherein the one or more received performance measurements comprise a mapping of the measured object to the VNF or VNFC instance and a mapping of a virtual network interface to the connection point, and a memory to store the one or more received performance measurements. Example twelve may include the subject matter of example eleven or any of the examples described herein, wherein the one or more performance measurements include a number of incoming bytes received in the virtual network interface or a number of outgoing bytes transmitted in the virtual network interface. Example thirteen may include the subject matter of example eleven or any of the examples described herein, wherein the one or more performance measurements include a number of incoming packets received in the virtual network interface or a number of outgoing packets transmitted in the virtual network interface.

In example fourteen, one or more non-transitory machine-readable media may have instructions thereon that when executed by an apparatus of a Virtualized Network Function Manager (VNFM) result in receiving one or more performance measurements related to a virtual network interface that are collected for a virtual compute instance from a Virtualized Infrastructure Manager (VIM) in a collection interval, mapping a measured object of the one or more performance measurements from the virtual compute instance to a Virtual Network Function (VNF) or a VNF component (VNFC) instance, mapping the virtual network interface to a connection point (CP) associated with the VNF or VNFC instance, to generate one or more performance measurements related the CP for the VNF or VNFC instance, and reporting the one or more performance measurements related the CP for the VNF or VNFC instance to an Element Manager (EM) or to a Network Function Virtualization Orchestrator (NFVO), or a combination thereof. Example fifteen may include the subject matter of example fourteen or any of the examples described herein, wherein the one or more performance measurements related the CP for the VNF or VNFC instance are split to sub-counter per CP of the VNFC instance contained by the VNF instance. Example sixteen may include the subject matter of example fourteen or any of the examples described herein, wherein the virtualized network interface has one to one mapping to the CP. Example seventeen may include the subject matter of example fourteen or any of the examples described herein, wherein the one or more performance measurements related the CP for the VNF or VNFC instance are generated by assigning a value of the received performance measurement related to a virtual network interface to counter per CP of a VNFC instance contained by a VNF instance if a measurement is received in a collection period. Example eighteen may include the subject matter of example fourteen or any of the examples described herein, wherein the one or more performance measurements related the CP for the VNF or VNFC instance are generated by aggregating the values of the one or more received performance measurements related to the virtual network interface to the counter per CP of a VNFC instance contained by a VNF instance if multiple measurements are received in a collection period. Example nineteen may include the subject matter of example fourteen or any of the examples described herein, wherein the VNF instance related to the one or more generated measurements contain one or more VNFC instances, wherein each VNFC instance contains one or more CPs. Example twenty may include the subject matter of example fourteen or any of the examples described herein, wherein an identifier vnfcInstanceId.CPId is used to identify a sub-counter, wherein vnfcInstanceId identifies the VNFC instance and CPId identifies the CP.

In example twenty-one, one or more non-transitory machine-readable media may have instructions thereon that when executed by an apparatus of a Network Function Virtualization Orchestrator (NFVO) result in receiving one or more performance measurements related to a connection point (CP) with VNF or a VNFC instance as a measured object from a Virtualized Network Function Manager (VNFM), and allocating resources for one or more additional VNF instances if the one or more performance measurements is less than a threshold, wherein the one or more received performance measurements comprise a mapping of the measured object to the VNF or VNFC instance and a mapping of a virtual network interface to the connection point. Example twenty-two may include the subject matter of example twenty-one or any of the examples described herein, wherein the one or more performance measurements include a number of incoming bytes received in the virtual network interface or a number of outgoing bytes transmitted in the virtual network interface. Example twenty-three may include the subject matter of example twenty-one or any of the examples described herein, wherein the one or more performance measurements include a number of incoming packets received in the virtual network interface or a number of outgoing packets transmitted in the virtual network interface.

In example twenty-four, one or more non-transitory machine-readable media may have instructions thereon that when executed by an apparatus of an Element Manager (EM) result in receiving one or more performance measurements related to a connection point (CP) with VNF or a VNFC instance as a measured object from a Virtualized Network Function Manager (VNFM), and allocating resources for one or more additional VNF instances if the one or more performance measurements is less than a threshold, wherein the one or more received performance measurements comprise a mapping of the measured object to the VNF or VNFC instance and a mapping of a virtual network interface to the connection point. Example twenty-five may include the subject matter of example twenty-four or any of the examples described herein, wherein the one or more performance measurements include a number of incoming bytes received in the virtual network interface or a number of outgoing bytes transmitted in the virtual network interface. Example twenty-six may include the subject matter of example twenty-four or any of the examples described herein, wherein the one or more performance measurements include a number of incoming packets received in the virtual network interface or a number of outgoing packets transmitted in the virtual network interface. Example twenty-seven may include machine-readable storage including machine-readable instructions, when executed, to realize an apparatus described in any preceding example.

In the description herein and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the description herein and/or claims, the terms "comprise" and "include," along with their derivatives, may be used and are intended as synonyms for each other.

Although the claimed subject matter has been described with a certain degree of particularity, it should be recognized that elements thereof may be altered by persons skilled in the art without departing from the spirit and/or scope of claimed subject matter. It is believed that the subject matter pertaining to connection point related performance measurements in a network function virtualization environment and many of its attendant utilities will be understood by the forgoing description, and it will be apparent that various changes may be made in the form, construction and/or arrangement of the components thereof without departing from the scope of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a Virtualized Network Function Manager (VNFM), comprising:
one or more processors configured to perform operations comprising:
receiving one or more performance measurements related to a virtual network interface that are collected for a virtual compute instance from a Virtualized Infrastructure Manager (VIM) in a collection intervals;
mapping a measured object of the one or more performance measurements from the virtual compute instance to a Virtual Network Function (VNF) or a VNF component (VNFC) instance;
mapping the virtual network interface to a connection point (CP) associated with the VNF or VNFC instance; and,
generating one or more performance measurements related to the CP for the VNF or VNFC instance, wherein the one or more performance measurements related to the CP for the VNF or VNFC instance are to be reported to an Element Manager (EM) or to a Network Function Virtualization Orchestrator (NFVO), or a combination thereof; and
a memory to store the one or more performance measurements related to the CP for the VNF or the VNFC instance.

2. The apparatus of claim 1, wherein the one or more performance measurements related to the CP for the VNF or VNFC instance are split to sub-counter per CP of the VNFC instance contained by the VNF instance.

3. The apparatus of claim 1, wherein the virtualized network interface has one to one mapping to the CP.

4. The apparatus of claim 1, wherein the one or more performance measurements related to the CP for the VNF or VNFC instance are generated by assigning a value of the received performance measurement related to a virtual network interface to counter per CP of a VNFC instance contained by a VNF instance if a measurement is received in a collection period.

5. The apparatus of claim 1, wherein the one or more performance measurements related to the CP for the VNF or VNFC instance are generated by aggregating the values of the one or more received performance measurements related to the virtual network interface to the counter per CP of a VNFC instance contained by a VNF instance if multiple measurements are received in a collection period.

6. The apparatus of claim 1, wherein the VNF instance related to the one or more generated measurements may contain one or more VNFC instances, wherein each VNFC instance contains one or more CPs.

7. The apparatus of claim 1, wherein an identifier vnfcInstanceId.CPId is used to identify a sub-counter, wherein vnfcInstanceId identifies the VNFC instance and CPId identifies the CP.

8. One or more non-transitory machine-readable media having instructions thereon that when executed by an apparatus of a Virtualized Network Function Manager (VNFM), result in:
receiving one or more performance measurements related to a virtual network interface that are collected for a virtual compute instance from a Virtualized Infrastructure Manager (VIM) in a collection interval;
mapping a measured object of the one or more performance measurements from the virtual compute instance to a Virtual Network Function (VNF) or a VNF component (VNFC) instance;
mapping the virtual network interface to a connection point (CP) associated with the VNF or VNFC instance, to generate one or more performance measurements related to the CP for the VNF or VNFC instance; and
reporting the one or more performance measurements related to the CP for the VNF or VNFC instance to an Element Manager (EM) or to a Network Function Virtualization Orchestrator (NFVO), or a combination thereof.

9. The one or more non-transitory machine-readable media of claim 8, wherein the one or more performance measurements related to the CP for the VNF or VNFC instance are split to sub-counter per CP of the VNFC instance contained by the VNF instance.

10. The one or more non-transitory machine-readable media of claim 8, wherein the virtualized network interface has one to one mapping to the CP.

11. The one or more non-transitory machine-readable media of claim 8, wherein the one or more performance measurements related to the CP for the VNF or VNFC instance are generated by assigning a value of the received performance measurement related to a virtual network interface to counter per CP of a VNFC instance contained by a VNF instance if a measurement is received in a collection period.

12. The one or more non-transitory machine-readable media of claim 8, wherein the one or more performance measurements related to the CP for the VNF or VNFC instance are generated by aggregating the values of the one or more received performance measurements related to the virtual network interface to the counter per CP of a VNFC instance contained by a VNF instance if multiple measurements are received in a collection period.

13. The one or more non-transitory machine-readable media of claim 8, wherein the VNF instance related to the one or more generated measurements contain one or more VNFC instances, wherein each VNFC instance contains one or more CPs.

14. The one or more non-transitory machine-readable media of claim 8, wherein an identifier vnfcInstanceId.CPId is used to identify a sub-counter, wherein vnfcInstanceId identifies the VNFC instance and CPId identifies the CP.

15. A method comprising:
receiving one or more performance measurements related to a virtual network interface that are collected for a virtual compute instance from a Virtualized Infrastructure Manager (VIM) in a collection interval;

mapping a measured object of the one or more performance measurements from the virtual compute instance to a Virtual Network Function (VNF) or a VNF component (VNFC) instance;

mapping the virtual network interface to a connection point (CP) associated with the VNF or VNFC instance, to generate one or more performance measurements related to the CP for the VNF or VNFC instance; and reporting the one or more performance measurements related to the CP for the VNF or VNFC instance to an Element Manager (EM) or to a Network Function Virtualization Orchestrator (NFVO), or a combination thereof.

16. The method of claim 15, wherein the one or more performance measurements related to the CP for the VNF or VNFC instance are split to sub-counter per CP of the VNFC instance contained by the VNF instance.

17. The method of claim 15, wherein the virtualized network interface has one to one mapping to the CP.

18. The method of claim 15, wherein the one or more performance measurements related to the CP for the VNF or VNFC instance are generated by assigning a value of the received performance measurement related to a virtual network interface to counter per CP of a VNFC instance contained by a VNF instance if a measurement is received in a collection period.

19. The method of claim 15, wherein the one or more performance measurements related to the CP for the VNF or VNFC instance are generated by aggregating the values of the one or more received performance measurements related to the virtual network interface to the counter per CP of a VNFC instance contained by a VNF instance if multiple measurements are received in a collection period.

20. The method of claim 15, wherein the VNF instance related to the one or more generated measurements contain one or more VNFC instances, wherein each VNFC instance contains one or more CPs.

* * * * *